J. A. DEASY.
VALVE.
APPLICATION FILED FEB. 21, 1910.
960,260.
Patented June 7, 1910.
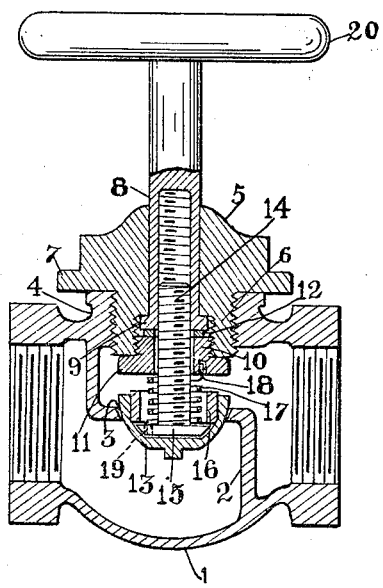
Witnesses
A. W. Shannon
G. E. McIsram
Inventor
JOHN A. DEASY
By Henry A. Welch
Attorney

UNITED STATES PATENT OFFICE.

JOHN A. DEASY, OF DETROIT, MICHIGAN.

VALVE.

960,280.

Specification of Letters Patent.

Patented June 7, 1910.

Application filed February 21, 1910. Serial No. 545,009.

*To all whom it may concern:*

Be it known that I, JOHN A. DEASY, a citizen of the United States, residing at Detroit, in the county of Wayne and State of Michigan, have invented certain new and useful Improvements in Valves, of which the following is a specification.

This invention relates to a valve, and more particularly to an arrangement thereof which obviates the necessity of packing or the like around the valve-stem.

The invention consists in the matters hereinafter set forth, and more particularly pointed out in the accompanying drawings.

The drawing is a view in central, longitudinal section of a valve that embodies features of the invention.

Referring thereto, a substantially cylindrical casing, fitted at each end for connection with piping is divided by a cross wall or diaphragm 2 in which there is an apertured valve seat 3 in substantially axial alinement with a lateral nipple 4 on the casing. A bonnet 5 has an annular body 6 exteriorly screwthreaded to engage interior threads in the nipple 4 and an outer flange 7 that is seated on the outer face of the nipple. A stem 8 that is rotatable in a guide aperture in the bonnet smaller than the internal diameter of the body 6, has a flange or head 9 on the inner end. A collar 10 that is exteriorly screwthreaded to engage interior screwthreads in the body 6, and is provided with a flange 11 adapted for reception of a spanner or wrench, and seated against the outer annular end of the body, retains the stem with the flange 9 in contact with the inner end face of the body 6, a metal washer 12 being interposed.

A hemispherical or cup-shaped closure 13 is loosely and rotatably secured to the lower end of a screwthreaded post 14, by a disk or head 15 fixed thereon, and retained in the closure by a spring 16 sufficient play being given the closure to allow the latter to center itself on the seat 3 readily. The post engages an axial, screwthreaded socket in the lower portion of the stem 8. A spiral spring 17 encircles the post with one end entering a recess 18 in the collar 10 and the other engaging a recess 19 in the disk or head 15 and is in compression between these parts. The spring serves to prevent the post turning with the stem, when the latter is rotated as by a suitable hand wheel 20, wrench or the like.

In operation when the valve is opened, any liquid to escape must pass through the threads of the post and of the collar and then around the joint made by the head seated on the face in the body recess and past the stem which has good turning fit in the guide aperture of the body. Similarly, when closed, these same obstacles are encountered, and furthermore, the stem is pressed outwardly and firmly against the underside of the bonnet by its pressure on the seat. There is no packing to deteriorate, or to vitiate the fluid passing through the casing.

Obviously, changes in the details of construction may be made without departing from the spirit of the invention and I do not care to limit myself to any particular form or arrangement of parts.

What I claim as my invention is:—

1. A valve comprising a substantially cylindrical casing divided internally by a diaphragm having a valve-seat, a lateral nipple on the casing in substantially axial alinement with the seat, a bonnet having a guide aperture and an annular body detachably secured in the nipple, a stem rotatable in the guide aperture in the bonnet having a flange on its inner end bearing against the under side of the bonnet within the body and an axial socket in its lower end, a collar detachably secured on the body for retaining the stem, a post having screwthreaded engagement with the axial socket in the inner portion of the stem, a cup-shaped closure rotatable and oscillatory on the end of the post, and a spring encircling the post between the closure and the collar and interlocking with the collar and the post at its ends.

2. A valve comprising a substantially cylindrical casing, a diaphragm dividing the casing and having a valve-seat, a lateral nipple on the casing in substantially axial alinement with the seat, a bonnet having a guide aperture and an annular body in screwthreaded engagement with the nipple, a stem rotatable in the guide aperture in the bonnet having an axial socket in its lower end, a flange on the inner end of the stem, a stop collar in screwthreaded engagement with the body holding the stem flange seated against the underside of the bonnet in the body, a washer interposed between the collar and stem, a post having screwthreaded engagement with the axial socket in the inner portion of the stem, a cup-shaped closure rotatable and oscillatory on the end of the post, and a spring encircling the post between the closure and the collar and interlocking with the collar and the post at its ends.

3. A valve comprising a substantially cylindrical casing divided internally by a diaphragm having a valve seat, a lateral nipple on the casing in substantially axial alinement with the seat, a bonnet having a guide aperture and an annular body detachably secured in the nipple, a stem rotatable in the guide aperture in the bonnet having an axial socket in its inner end and a flange on its inner end bearing against the underside of the bonnet within the body, a collar detachably secured on the body for retaining the stem, a post having screwthreaded engagement with the axial socket in the inner portion of the stem, a disk secured to the end of the post, a cup-shaped closure for the seat rotatable and oscillatory on the disk, a ring retaining the closure loosely on the disk, and a spiral spring encircling the post with its ends entering recesses in the adjacent faces of the disk and collar.

4. A valve comprising a substantially cylindrical casing, a diaphragm dividing the casing and having a valve-seat, a lateral nipple on the casing in substantially axial alinement with the seat, a bonnet having a guide aperture and an annular body in screwthreaded engagement with the nipple, a stem rotatable in the guide aperture in the bonnet having an axial socket in its inner end, a flange on the inner end of the stem, a stop collar in screwthreaded engagement with the body holding the stem flange seated against the underside of the bonnet in the body, a washer interposed between the collar and stem, a post having screwthreaded engagement with the axial socket in the inner portion of the stem, a disk secured to the end of the post, a cup-shaped closure for the seat rotatable and oscillatory on the disk, a ring retaining the closure loosely on the disk, and a spiral spring encircling the post with its ends entering recesses in the adjacent faces of the disk and collar.

In testimony whereof I affix my signature, in presence of two witnesses.

JOHN A. DEASY.

Witnesses:
DENNIS B. HAYES,
MAUDE E. HENSIEN.